Patented Nov. 12, 1929

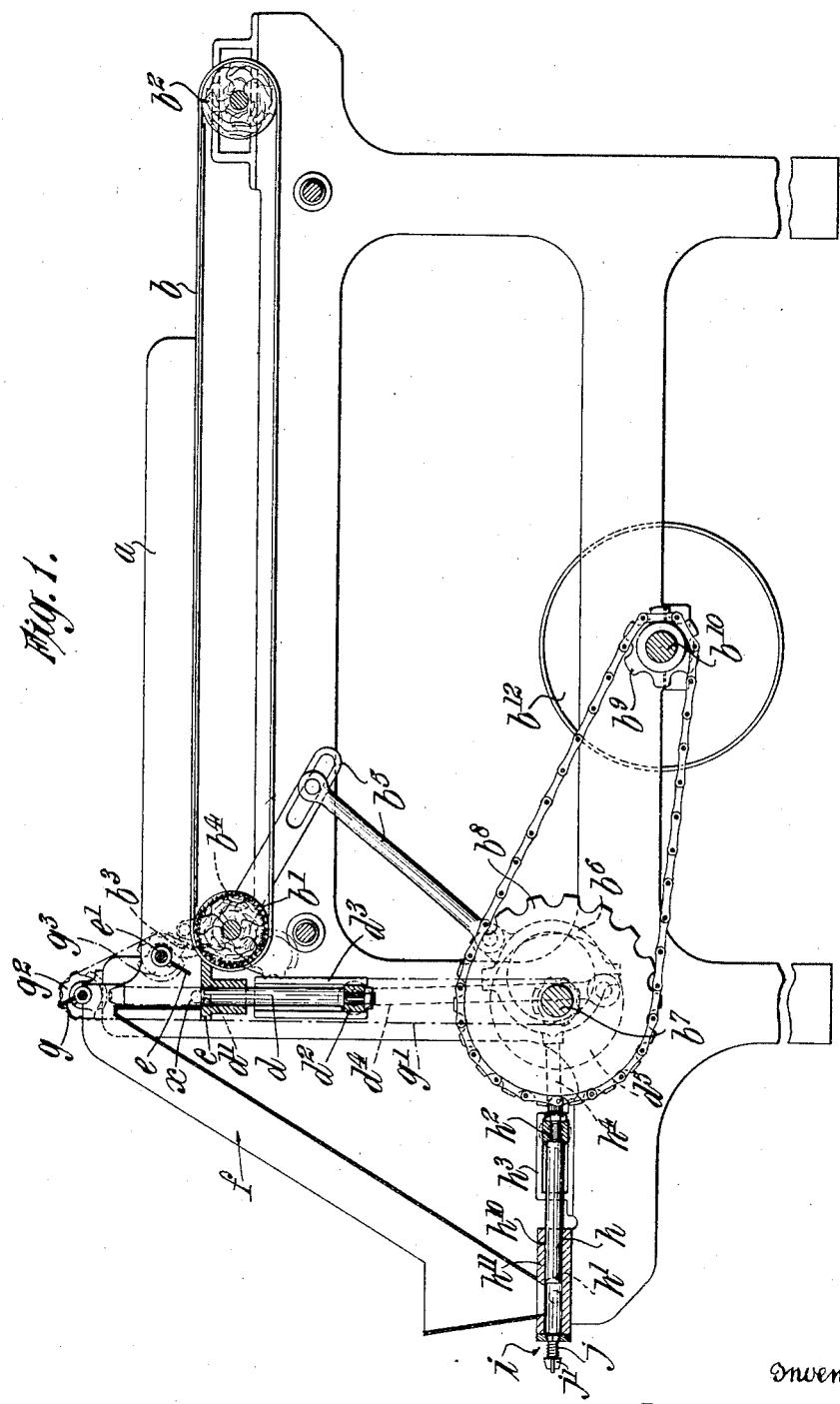

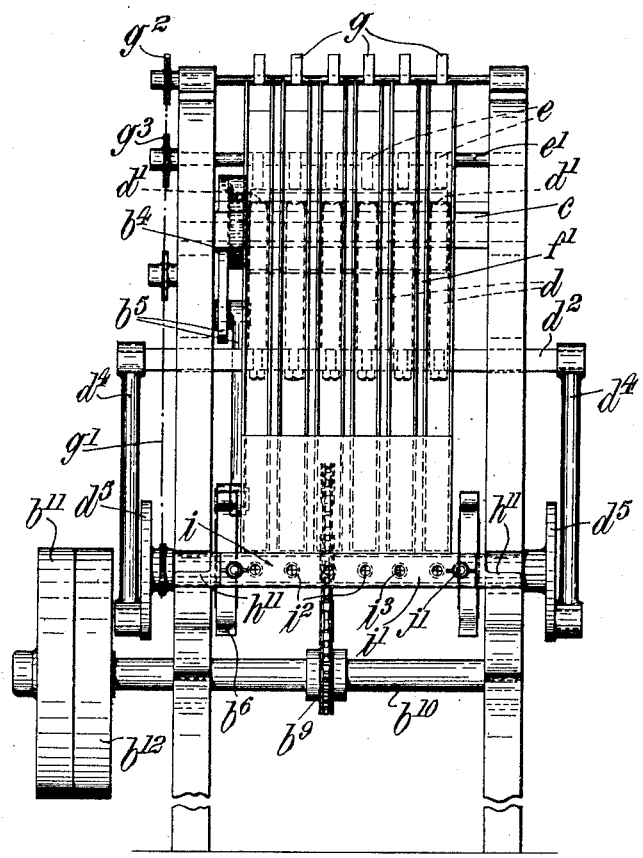

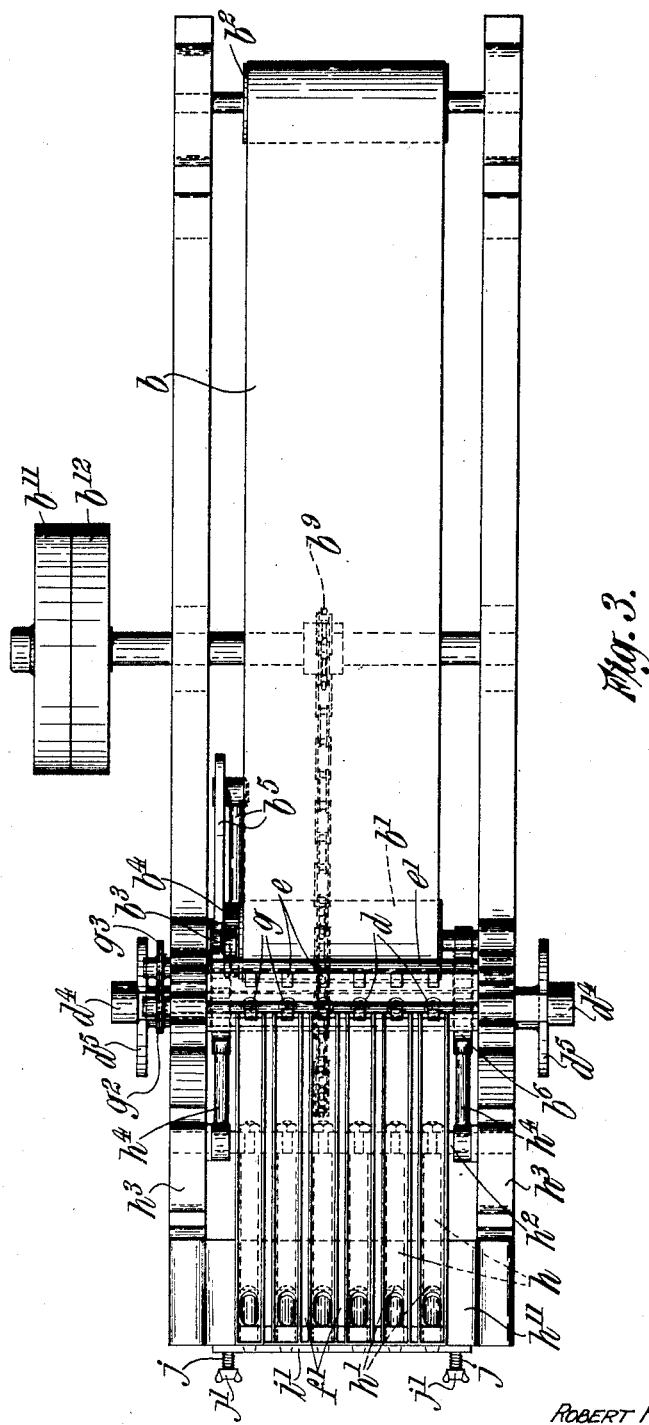

1,735,174

UNITED STATES PATENT OFFICE

ROBERT FRENCH MACFARLANE, OF LONDON, ENGLAND

APPARATUS FOR DIVIDING OR CUTTING FRUITS AND THE LIKE

Application filed March 30, 1927, Serial No. 179,656, and in Great Britain April 10, 1926.

This invention relates to a new or improved apparatus for dividing or cutting fruits and the like which are of a sticky nature and is particularly intended for automatically cutting so called glacé or sugared cherries, which have been previously stoned, into halves, quarters or other desired number of pieces, such cherries being used in large quantities for application to biscuits, cakes, confectionery and the like.

With this end in view the apparatus broadly stated comprises means for positively feeding the fruit to a number of members which select and raise the individual fruits to a position whence they are again positively transferred to a chute down which they pass to chambers containing plungers which force them through cutting dies or equivalents adapted to separate them into the required number of pieces the whole operation being automatic and involving no handling by operatives except possibly in the initial stages for removing defective fruit.

In a practical embodiment of the invention shown in the accompanying drawings Fig. 1 is a vertical section of the machine.

Fig. 2 is a view from the left of Fig. 1.

Fig. 3 is a plan view, and Figs. 4 and 5 are detail views of the cutting dies.

The apparatus shown comprises a trough or channelled table $a$ the base of which is formed by an endless belt or conveyor $b$, for example of rubber, passing about pulleys $b^1$ $b^2$ and adapted to be given an intermittent feed motion. This motion is transmitted through the medium of pawl and ratchet and link mechanism $b^3$, $b^4$, $b^5$ from an eccentric $b^6$ on a shaft $b^7$ the latter being driven by chain and sprocket gear $b^8$ $b^9$ from a main drive shaft $b^{10}$ carrying fast and loose pulleys $b^{11}$ $b^{12}$. Whilst on the conveyor $b$ the fruit $x$ may be inspected by the operative and sorted, or defective fruits removed; those remaining being fed along on to a metal plate $c$ at the end of the conveyor and through which plate work a number of selecting members or lifters $d$ conveniently in the form of vertical plungers recessed or dished at their upper ends, as at $d^1$, to each receive a single fruit. The fruit is pushed or fed from the conveyor on to said plate by means of revolving wipers which may be in the form of resilient arms $e$, as of rubber, mounted on a rotary spindle $e^1$ above the conveyor, said wipers ensuring a mass of fruit of sufficient depth being accumulated on the plate to enable the selectors $d$ to always have enough material to each select a single fruit as stated. The said selectors $d$ are preferably separated from each other by partitions forming spaced tracks in which they operate, and raise the fruits to the upper end of a chute $f$ into which they are discharged from the ends of the selectors by another series of flexible wipers $g$ similar to those above mentioned. This chute is preferably inclined and divided into separate tracks by partitions $f^1$. The fruits slide down said tracks by gravity and at the bottom of each is a horizontally reciprocable plunger $h$, sliding in apertures $h^{10}$ in a plate $h^{11}$ the forward end of which plunger is dished or shaped as at $h^1$ to receive and centre the fruit as they come down the chute $f$ and force them through cutting dies $i$. The dies may be formed in a separate die plate $i^1$ and consist of apertures $i^2$ with one or more blades $i^3$, wires or the like stretched across the apertures so that as the plungers force the fruit through they are divided or cut into as many pieces as the blades or wires provide for. The fruits so divided fall from the dies by passing into a suitable receptacle or may be otherwise removed or dealt with.

The vertical and horizontal plungers $d$ and $h$ respectively are mounted on crossheads $d^2$, $h^2$ working in guides $d^3$, $h^3$ and connected by links $d^4$, $h^4$ to pairs of crank discs $d^5$ and eccentrics $b^6$ on the shaft $b^7$. The wipers $e$, $g$ are driven from the shaft $b^7$ by means of chain and sprocket gear $g^1$, $g^2$, $g^3$.

In order to provide for the possibility of more than one fruit being picked up by the selectors at a time there is sufficient clearance at the base of the chute between the plunger and the die to accommodate two, three or more fruits, but in practice a single fruit only is usually lifted by each selector.

The die apertures are preferably slightly tapered towards the exit as at $i^4$ with the diameter at the inlet corresponding to that of the plunger $h$, with however sufficient clearance for proper operation. This arrangement together with the dishing of the end of the plunger provides for a good lead in for the fruit to the die. The die plates may be interchangeable and are preferably resiliently mounted in position by means of springs $j$ coiled about thumb screws $j^1$ to allow a certain amount of give should by any chance stones or other hard foreign substance be delivered with the fruit.

What I claim as my invention and desire to secure by Letters Patent of the United States is:—

1. Apparatus for automatically dividing fruit and the like comprising in combination, means for selecting individual fruits from a mass, plungers, means for transferring said fruits from said selecting means to be acted upon by the plungers, cutting dies through which said fruits are forced by said plungers for dividing them to the required number of parts, a conveyor for feeding the fruits towards said selecting means, and rotary wipers for passing said fruits from the conveyor to the selecting means, said wipers being of resilient material operating to ensure the mass of fruit being accumulated in the path of the selecting means whereby the latter may select single fruits.

2. Apparatus for automatically dividing fruit and the like comprising in combination, a plurality of slidable lifting elements each adapted to select individual fruits from a mass, plungers, means for transferring said fruits from said selecting means to be acted upon by the plungers, said means comprising a chute and means for transferring the fruit lifted by the aforesaid lifting elements into said chute, cutting dies through which said fruits are forced by said plungers for dividing them to the required number of parts, a conveyor for feeding the fruits towards said lifting elements, and rotary wipers for passing said fruits from the conveyor to the lifting elements, said wipers being of resilient material operating to ensure the mass of fruit being accumulated adjacent the lifting elements whereby the latter may select single fruits, and raise them from the mass fed thereto.

3. Apparatus for automatically dividing fruit and the like comprising in combination, a plurality of slidable lifting elements each adapted to select individual fruits from a mass, plungers, means for transferring said fruits from said selecting means to be acted upon by the plungers, said means comprising a chute divided into tracks each corresponding to a lifting element and wipers for transferring the fruits from the elevated lifting elements into the respective tracks, cutting dies through which said fruits are forced by said plungers for dividing them to the required number of parts, a conveyor for feeding the fruits towards said lifting elements, rotary wipers for passing said fruits from the conveyor to the lifting elements, said wipers being of resilient material operating to ensure the mass of fruit being accumulated adjacent the lifting elements whereby the latter may select single fruits, and raise them from the mass fed thereto.

4. In apparatus for automatically dividing fruit and the like, the combination of slidable lifting elements each adapted to select and raise individual fruits from a mass, cutting devices, a chute leading to said cutting devices from a position adjacent said lifting elements in elevated position and a rotary wiper for transferring the individual fruits from said lifting elements to the said chute.

5. In apparatus for automatically dividing fruit and the like, the combination of slidable lifting elements each adapted to select and raise individual fruits from a mass, cutting devices, a chute leading to said cutting devices from a position adjacent said lifting elements in elevated position and a resilient rotary wiper for transferring the individual fruits from said lifting elements to the said chute.

In witness whereof I have signed this specification.

ROBERT FRENCH MACFARLANE.